United States Patent
Steiner et al.

[11] 3,882,906
[45] May 13, 1975

[54] WIRE WINDING MACHINE

[75] Inventors: Ewald Steiner, Allmannshausen; Hans Scholtholt, Munich-Lohhof, both of Germany

[73] Assignee: Siemens Aktiengesellschaft, Postfach 261, Germany

[22] Filed: June 26, 1973

[21] Appl. No.: 373,736

[30] Foreign Application Priority Data
June 30, 1972 Germany............................ 2232246

[52] U.S. Cl................................. 140/124; 242/7.17
[51] Int. Cl............................................... B21f 15/00
[58] Field of Search............ 140/119, 124; 242/7.17; 81/9.1; 7/14.1

[56] References Cited
UNITED STATES PATENTS

| | | | |
|---|---|---|---|
| 2,807,810 | 10/1957 | Belek et al. | 140/124 |
| 3,554,243 | 1/1971 | DeRose et al. | 81/9.5 |
| 3,625,262 | 12/1971 | Baker et al. | 140/124 |

Primary Examiner—Lowell A. Larson
Attorney, Agent, or Firm—Schuyler, Birch, Swindler, McKie & Beckett

[57] ABSTRACT

A wire winding machine for connecting insulated jumper wires to contact pins is disclosed, utilizing a winding spindle rotatable in a sleeve about a winding axis. The winding spindle includes a wire guiding channel running toward a frontal surface of the spindle for directing the wire to the contact pin, the channel including a first portion terminating in an end surface lying at an angle with the frontal surface to form a wedge-shaped intersection therewith to form first cutting edges for stripping the insulation from said wire. The wire guiding channel also includes a U-shaped recess extending from the end surface of the first portion to said frontal surface to pass the wire core to the pin, the boundary surface of this U-shaped recess having a cutting edge formed by the intersection of said boundary with an inclined surface which may be a surface of revolution parallel to the frontal surface, or a conical or curved surface parallel to the channel recess axis or the winding spindle axis, said recess cutting edges meeting said first cutting edges substantially at right angles.

17 Claims, 11 Drawing Figures

3,882,906

WIRE WINDING MACHINE

BACKGROUND OF THE INVENTION

The invention relates to a wire winding machine for connecting insulated jumper wires to contact pins by means of a winding spindle rotatable in a sleeve about a winding axis, the winding spindle being provided with cutting edges for stripping insulation mounted permanently on the winding spindle and extending into a wire guiding channel of the winding spindle with a view to stripping jumper wires. The cutting edges for stripping insulation are formed by the wedge-shaped intersection of the frontal face of the winding spindle with the end face of the wire guiding channel terminating just ahead of the frontal face and defining a U-shaped recess for the passage of the wire core, as disclosed in German patent application Ser. No. P 19 49 144.2-34.

The efficient operation of such a wire winding machine by which solderless wire connections, known as "wire-wrap connections," can be provided and wherein upon rotation of the winding spindle the insulation of the jumper wire between cutting edges is stripped automatically, is critically dependent upon the shape and quality of the cutting edges used for stripping insulation, due to the differing insulation materials that have to be penetrated and the varying adhesion between this insulation and the wire core. It should be possible without requiring a great expenditure of money, to provide the cutting edges for stripping insulation with a high degree of precision and with maximum stability and cutting ability.

One object of the present invention is to improve wire winding machines of the type described in the above designated German patent application so that even with very small dimensions the precision of the cutting edges for stripping insulation is increased and the production made easy.

SUMMARY OF THE INVENTION

In accordance with the invention, the foregoing and other objects are achieved in that in a wire winding machine of the type referred to above there are formed on the borders of the U-shaped recess, due to their intersection with revolution surfaces, cutting edges which directly adjoin the cutting edges formed by the wedge-shaped intersection and substantially at right angles thereto.

According to the invention, the production cost can substantially be reduced as a result of the construction of the cutting edges in the area of the U-shaped recess. Likewise, just as the insulation-stripping cutting edges at right angles to the boundary edges of the recess may be produced through simple plunging, e.g., of a circular cylindrical cutting tool, a milling cutter, a grinding tool or a profiled or forming electrode operating along the electroerosive processing principle or the like, the cutting edges in the recess area may also be provided by implements producing revolution surfaces in one continuous process. In particular, a part of the winding spindle that has already been hardened can be made in a spark-machining (electro-sparking) process. Insulation-stripping cutting edges according to the invention can be constructed in this manner by simple means with a constant high precision with regard to the cutting angle, cutting keenness, etc., thereby increasing the efficiency and service life of the machine. Further, it can be ensured by using such means that the cutting edges in the area of the boundary edges of the recess blend smoothly into the cutting edges at right angles thereto.

By utilizing the cutting edges described herein, the jumper wire insulation is not merely urged against the cutting edges and cut into at the cutting point at the start of the winding process and then pressed apart in wedge-like fashion; rather, almost the whole splitting of the insulation is effected by means of sharp-edge cutting edges.

A further development of the invention is characterized by the fact that the cutting edges in the recess area are formed by the intersection of the frontal surface of the winding spindle with a revolution surface. Such cutting edges disposed in the area of the boundary edges of the recess lying opposite one another can be made by simply plunging a cylindrical machining tool parallel to the frontal surface. A perfect blending of the last-mentioned cutting edges into the existing cutting edges running perpendicular thereto is thus assured.

Another further development of the invention is characterized by the fact that the cutting edges in the recess area are in each case produced by the intersection of two boundary edges of the U-shaped recess with a conical or curved revolution surface, whose axis of rotation runs perpendicular to the boundary edges. In this way, a cutting edge is provided which revolves around the entire U-shaped recess, thereby splitting the insulation of the jumper wire to be divided three-fourths of the way around. By using such a cutting edge, jumper wires made of very tough insulation materials, such as used for high-quality electrical wiring, e.g., in electronic computers, can be worked.

In another desirable embodiment of the invention in which the cutting edges for stripping insulation can be easily made, the cutting edges in the recess area are formed by the intersection of the two inner boundary edges turned toward the wire-guiding channel with a conical or curved revolution surface, whose axis of rotation runs perpendicular to the frontal surface of the winding spindle. In this case, the machining tool can be placed parallel to the axis of the winding spindle in the recess area, thereby preventing the machining tool from moving, for example, perpendicular to the axis of rotation.

In a further refinement of the invention, the area between the cutting edges of the recess and the frontal surface of the winding spindle is rounded so as to avoid damaging the sensitive wire core as it runs out from the apparatus.

Another desirable embodiment is characterized by the fact that the distance between the cutting edges of the recess and the adjoining boundary surface of the wire guiding channel is smaller than a single thickness of the insulation being removed from the jumper wire to be wound. In this way, the bare wire core, as it is freed from the insulation, is prevented from coming into contact with the cutting edge and possibly being damaged as it runs out of the machine.

BRIEF DESCRIPTION OF THE DRAWING

The principles of the invention will be more readily understood by reference to the description of preferred embodiments given hereinbelow in conjunction with the drawing of a wire winding machine according to the invention, wherein.

DESCRIPTION OF PREFERRED EMBODIMENTS

Figure 1:
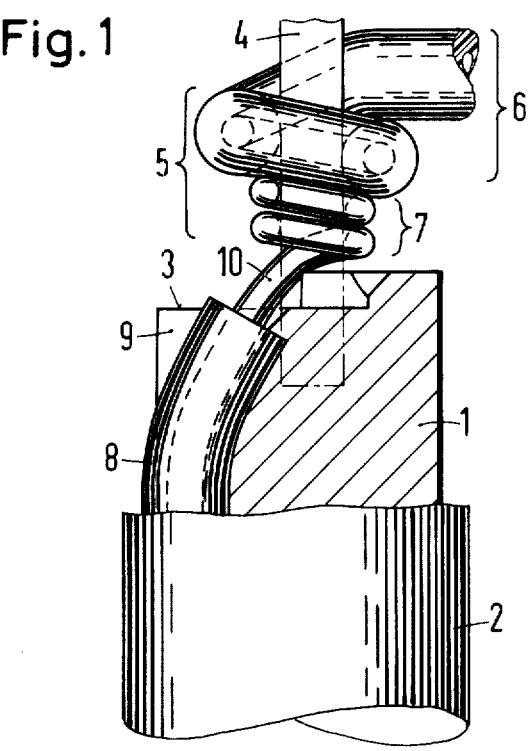
FIG. 1 is a side elevation, with parts in section, of the wire winding machine described in the above cited patent application.

FIG. 1 shows a cylindrical winding spindle 1 which is rotatably mounted in a tubular sleeve 2. The winding spindle 1 is essentially defined by a plane frontal surface 3. The figure shows a contact pin 4 extending into a bore of the winding spindle, a winding 5 already being wound thereupon and consisting of an insulated winding 6 and several bare-wire windings 7. The jumper wire 8 forming the winding 5 is guided in the machine in a wire-guiding channel running substantially parallel to the axis of the winding and being curved towards the axis of the winding only in the vicinity of the frontal surface 3 of the winding spindle 1. The cutting edges for stripping insulation (not shown in detail) lie in the area of curvature of the running-out jumper wire 8 immediately at the front end of the winding spindle.

The jumper wire 8 in the figure has already passed through the cutting edges for stripping insulation; these cutting edges will be described in detail hereinbelow; a U-shaped recess is provided to allow the passage of the wire core of the jumper wire 8. The portion of the jumper wire insulation being extracted is pushed against the cutting edges for stripping insulation and is held there. After the winding spindle 1 starts rotating, the jumper wire 8 on the contact pin 4, which is still fully insulated, is at first stopped through rewinding. Due to the pull thereafter developed, the jumper wire 8 is pushed against the cutting edges for stripping insulation, the greater part of the insulation is split and upon continued rotation the insulation sections lying on both sides of the cutting starting point are torn apart, whereupon the wire core 10 stripped of insulation can be wound onto the contact pin 4.

Figure 2:
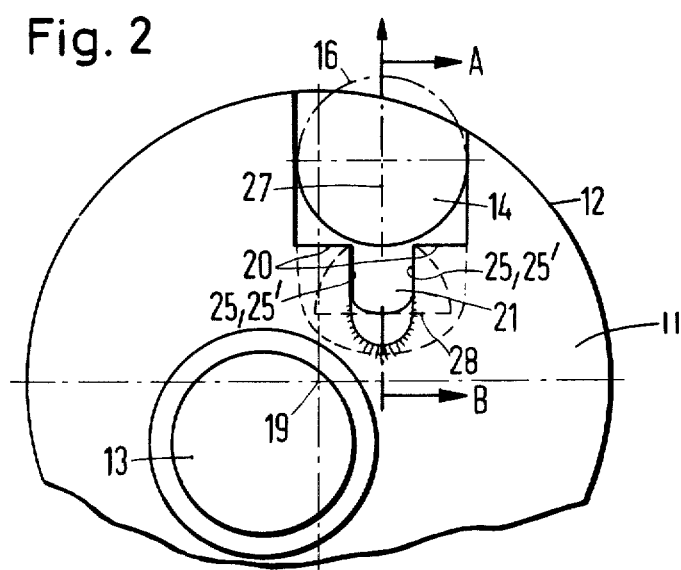
FIG. 2 is a top plan view.

FIG. 2 shows a top view of the frontal surface 11 of a winding spindle 12 designed in similar fashion to the winding spindle shown in FIG. 1 although the utility of the invention described herein is not limited to machines as described in the cited patent application. A bore 13 is provided for receiving a contact pin 4 such as shown in FIG. 1. Considering FIG. 3, a first portion 14 of a wire guiding channel is defined by a surface of revolution running parallel to the axis of the winding spindle 19 until point 15. This wire guiding channel portion 14 can be made by means of a cylindrical machining tool 16. A second portion 17 of the wire-guiding channel 1 is formed by a second revolution surface, whose axis of rotation 18 (FIG. 3) lies at an angle with the axis of the winding spindle 19 (FIG. 2). Due to the wedge-shaped intersection of the end face of the second portion 17 of the wire-guiding channel with the frontal surface 11, there results an intersection edge which forms cutting edges 20. Between the cutting edges 20 there is a U-shaped recess 21 which is again defined by revolution surfaces, whose axis of rotation runs coaxially to the axis of rotation 18. The two revolution surfaces which define the boundaries of the channel portion have varying diameters and are staggered in steplike fashion, thereby forming a supporting surface 22 on which the separated insulation of the jumper wire can be backed up. To prevent the wire core from being damaged when it runs out from the winding spindle, the edges 22 and 24 are slightly rounded at the bottom of the recess 21. On the border 25 of the recess 21 which lies in the plane of the frontal surface 11, cutting edges 25' are formed by the intersection of the frontal surface 11 with a revolution surface 26, with the axis of rotation 27 of the revolution surface 26 running parallel to the border 25. The cutting edges 25' are adjacent to the cutting edges 20 and run to the point 28.

Figure 4:
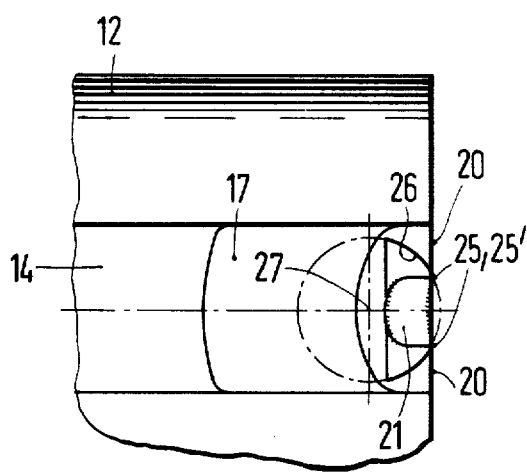
FIG. 4 is a front elevation view.
Figure 5:
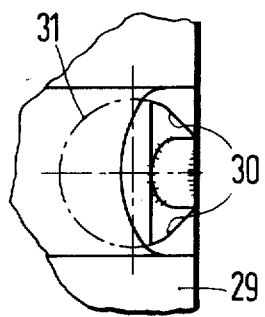
FIG. 5 is an alternative embodiment shown broken out from FIG. 4.

FIG. 5 shows a segment of a winding spindle 29 in accordance with FIG. 4, with the sections of the revolution surfaces 26 shown in FIG. 4 as concave cutting surfaces being strengthened into plane cutting surfaces 30. This can be achieved by providing a cylindrical machining punch 31 working on the electroerosive principle with sections that are plane in an axial direction.

Figure 3:
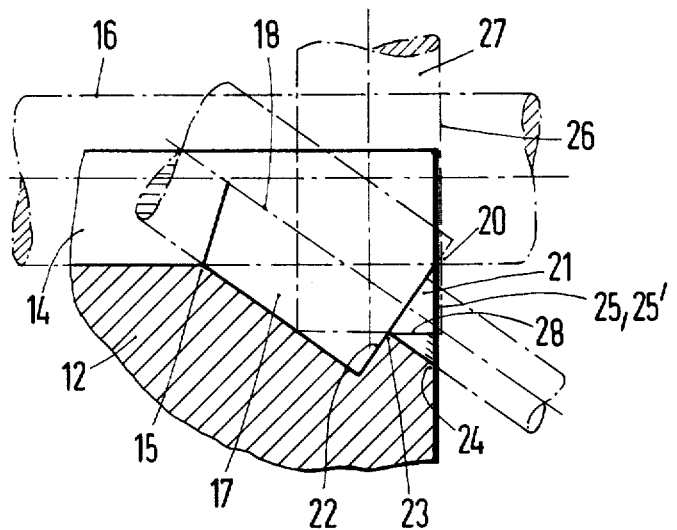
FIG. 3 is a view along line A–B of FIG. 2.
Figure 6:
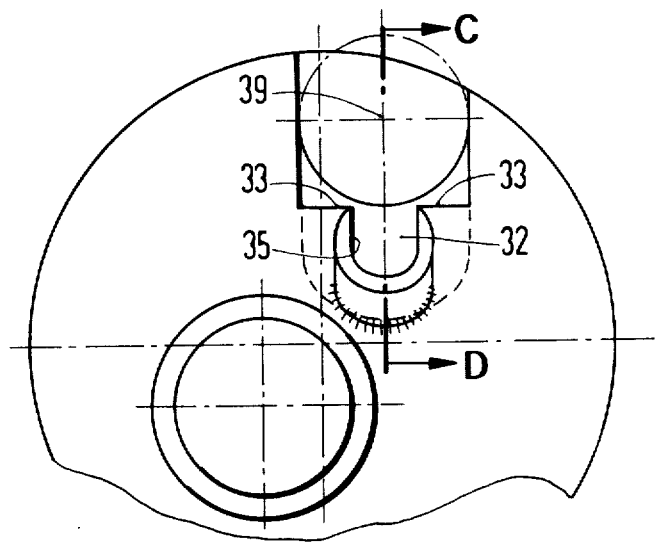
FIG. 6 is a top plan view of an alternative embodiment of the device of FIG. 1.
Figure 7:
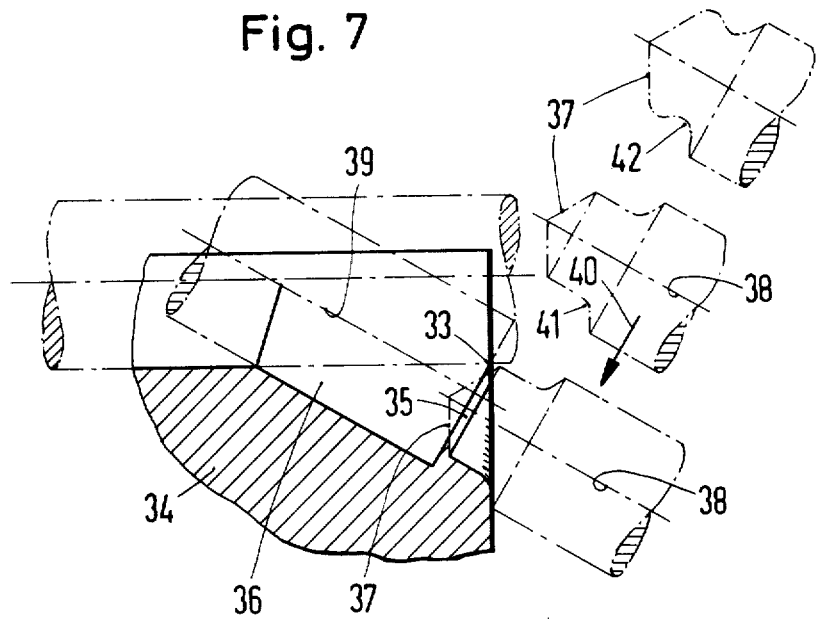
FIG. 7 is a sectional view taken along the line C–D of FIG. 6.
Figure 8:
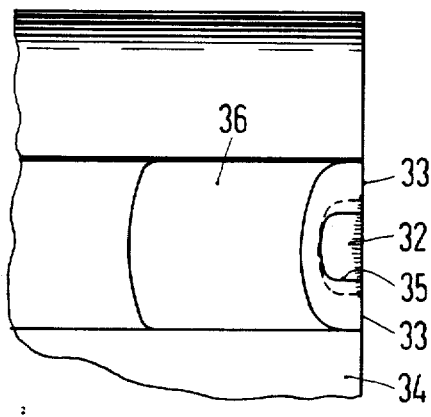
FIG. 8 is an elevation view of the FIG. 6 embodiment.

In the embodiments shown in FIGS. 6, 7 and 8, as in the preceding embodiment, the cutting edges 33 lying on both sides of a U-shaped recess 32 are formed by the wedge-shaped intersection of a revolution surface with the frontal surface of the winding spindle 34. Otherwise, the parts of the machine under discussion which correspond to the embodiment according to FIGS. 2 to 4 are not described further, since their construction can be understood from the description of FIGS. 2 to 4. As particularly shown in FIG. 7, which illustrates a sectional view along the line C–D in FIG. 6, the cutting edges 35 are formed by the intersection of two oppositely lying boundary edges of the recess 32 which are turned toward the wire guiding channel 36 and a conical revolution surface 37, whose axis of rotation 38 runs perpendicular to said boundary edges, and coaxially or in parallel to the axis of rotation 39 of the generatrix of the surface of revolution for the wire guiding channel 36. To make these cutting edges 35, which surround the entire recess 32, a machining tool defined by a dash-and-dot line, for example, a form grinding tool or milling tool is brought into the area of the recess 32 in the direction of the arrow 40. Rounded portions may be formed on the edges in the area between the cutting edges 35 and the frontal surface of the winding spindle 34 by means of appropriate round sections 41 or 42.

Figure 9:
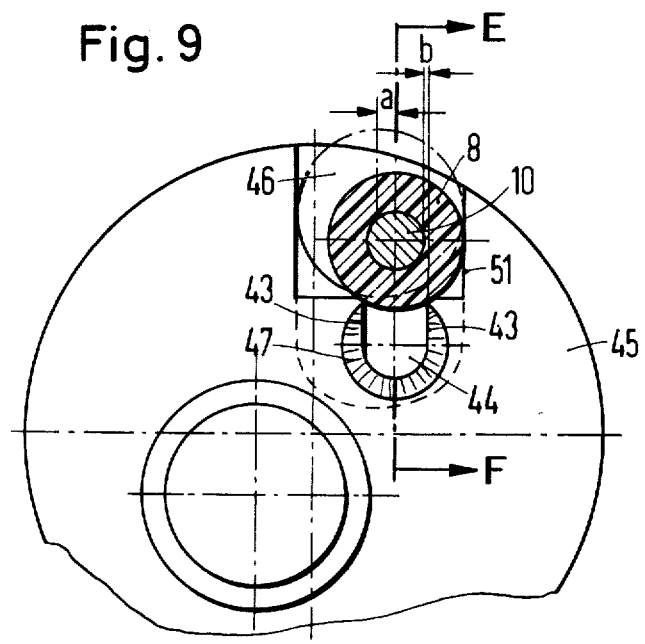
FIG. 9 is a top plan view of an alternative embodiment of the device of FIG. 1.
Figure 10:
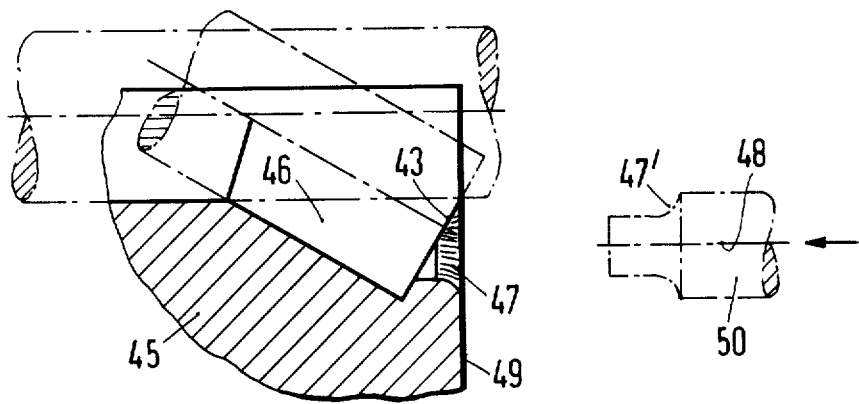
FIG. 10 is a sectional view taken along the line E–F of FIG. 9.
Figure 11:
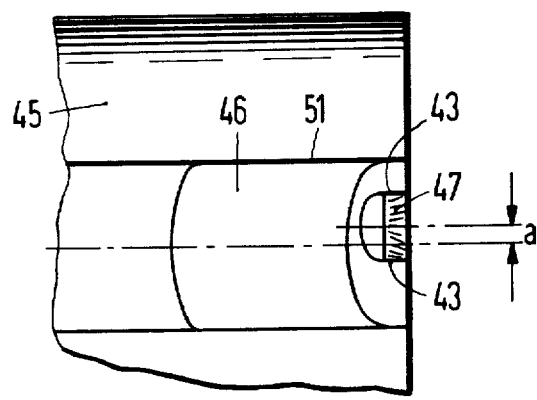
FIG. 11 is an elevation view of the FIG. 9 embodiment.

In the embodiment shown in FIGS. 9, 10 and 11 the cutting edges 43 in the area of the recess 47 of the winding spindle 45 are formed by the intersection of the two boundary edges of the recess 44 which face the wire-guiding channel 46 with a curved revolution surface 47, whose axis of rotation 48 runs perpendicular to the frontal surface 49 of the winding spindle 45. A negative form of this revolution surface 47 is particularly illustrated in FIG. 10 as the rounded transition 47' of a cylindrical machining tool 50, which is brought into the machining position in the direction of the arrow.

FIGS. 9 and 11 clearly show that the recess 44 is displaced by the distance a with respect to the center of the wire-guiding channel 46, so that the distance between the cutting edges 43 and the parallel boundary surface 51 of the wire-guiding channel 46 is smaller than the single thickness of the insulation of the jumper wire 8 to be wound by the distance b. The same is true of the embodiments in accordance with the FIGS. 2 to 8 (see particularly FIG. 5) for the distance between the lowest point of the wire-guiding channel, e.g., 17, and the lowest point of the recess, e.g., 21. The result is that the bare-wire core 10 is prevented from coming into contact with the being damaged by any portion of the cutting edges or the like as the bare-wire core 10 runs out from the winding spindle.

We claim:

1. A wire winding machine for connecting insulated jumper wires to contact pins by means of a winding spindle rotatable in a sleeve about a winding axis, said winding spindle including a wire guiding channel running toward a frontal surface of said spindle, said channel including a first portion terminating in an end surface lying at an angle with said frontal surface of said spindle and forming a wedge-shaped intersection with the frontal surface of said winding spindle to form first cutting edges for stripping the insulation from said wire, said wire guiding channel further including a U-shaped recess extending from said end surface to said frontal surface, the core of said wire issuing from said recess to be connected to said pin, the boundary of said U-shaped recess (21, 32, 44) having at least a cutting edge formed by the intersection of said boundary with a surface (26, 41, 47) inclined with respect to said frontal surface, said recess cutting edges meeting said first cutting edges (20, 23) substantially at right angles, said first cutting edges and said recess cutting edges being disposed inwardly from the wire guiding channel toward the winding axis of the spindle.

2. The machine of claim 1, characterized by the fact that said cutting edges (25') in the boundary of said recess (21) are defined by the intersection of said frontal surface (11) of said winding spindle (12) with said inclined surface said inclined surface being defined by a revolution surface (26) whose axis of rotation (27) runs parallel to said frontal surface.

3. The machine of claim 2, characterized by the fact that portions of said revolution surface (26) adjacent said boundary comprise plane or convex cutting surfaces (30).

4. The machine of claim 1, wherein said U-shaped recess includes cutting edges (35) defined by the intersection of said boundary of said U-shaped recess and a conical or curved revolution surface (37), whose axis of rotation (38) runs substantially parallel to the axis of said channel recess portion.

5. The machine of claim 1, wherein said U-shaped recess comprises cutting edges (43) defined by the intersection of the recess boundary with a conical or curved revolution surface (47), whose axis of rotation (48) runs parallel to the winding axis of said winding spindle (45).

6. The machine of claim 2, wherein the boundary surfaces of said first portion of said wire guiding channel and said U-shaped recess portion of said channel are defined by coaxial surfaces of revolution and staggered defining the boundaries of said channel portions running in angular relationship to the axis (19) of said winding spindle.

7. The machine of claim 6, wherein the distance between the intersection of said recess boundary and said first cutting edge and the non-cutting edge boundary surface (e.g., 51) of said wire guiding channel (e.g., 46) is less than a single thickness of the insulation of said jumper wire (8) to be wound.

8. The machine of claim 7 wherein the boundary surface portion between said cutting edges of said recess and said frontal area of said winding spindle is rounded.

9. The machine of claim 3 wherein the boundary surface portion between said cutting edges of said recess and said frontal area of said winding spindle is rounded.

10. The machine of claim 9, wherein the distance between the intersection of said recess boundary and said first cutting edge and the non-cutting edge boundary surface (e.g., 51) of said wire guiding channel (e.g., 46) is less than a single thickness of the insulation of said jumper wire (8) to be wound.

11. The machine of claim 10, wherein the boundary surfaces of said first portion of said wire guiding channel and said U-shaped recess portion of said channel are defined by coaxial surfaces of revolution and staggered in step-like fashion, the axes of rotation (e.g., 18) of the surfaces defining the boundaries of said channel portions running in angular relationship to the axis (19) of said winding spindle.

12. The machine of claim 4 wherein the boundary surface portion between said cutting edges of said recess and said frontal area of said winding spindle is rounded.

13. The machine of claim 12, wherein the distance between the intersection of said recess boundary and said first cutting edge and the non-cutting edge boundary surface (e.g., 51) of said wire guiding channel (e.g., 46) is less than a single thickness of the insulation of said jumper wire (8) to be wound.

14. The machine of claim 13, wherein the boundary surfaces of said first portion of said wire guiding channel and said U-shaped recess portion of said channel are defined by coaxial surfaces of revolution and staggered in step-like fashion, the axes of rotation (e.g., 18) of the surfaces defining the boundaries of said channel portions running in angular relationship to the axis (19) of said winding spindle.

15. The machine of claim 5 wherein the boundary surface portion between said cutting edges of said recess and said frontal area of said winding spindle is rounded.

16. The machine of claim 15, wherein the distance between the intersection of said recess boundary and said first cutting edge and the non-cutting edge boundary surface (e.g., 51) of said wire guiding channel (e.g., 46) is less than a single thickness of the insulation of said jumper wire (8) to be wound.

17. The machine of claim 16, wherein the boundary surfaces of said first portion of said wire guiding channel and said U-shaped recess portion of said channel are defined by coaxial surfaces of revolution and staggered in step-like fashion, the axes of rotation (e.g., 18) of the surfaces defining the boundaries of said channel portions running in angular relationship to the axis (19) of said winding spindle.

* * * * *